US007789200B2

(12) United States Patent
Munson

(10) Patent No.: US 7,789,200 B2
(45) Date of Patent: Sep. 7, 2010

(54) SUMP HOUSING

(75) Inventor: John Munson, Indianapolis, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 135 days.

(21) Appl. No.: 11/939,071

(22) Filed: Nov. 13, 2007

(65) Prior Publication Data

US 2008/0110813 A1 May 15, 2008

Related U.S. Application Data

(60) Provisional application No. 60/865,679, filed on Nov. 14, 2006, provisional application No. 60/865,680, filed on Nov. 14, 2006.

(51) Int. Cl.
*F01M 1/08* (2006.01)
*B01D 35/01* (2006.01)
*F01D 1/24* (2006.01)

(52) U.S. Cl. ...................... 184/1.5; 184/6.11; 184/6.12; 184/6.24; 184/6.28; 60/39.35; 60/772; 123/204; 384/462; 415/111; 415/168.2; 415/186

(58) Field of Classification Search .................. 184/1.5, 184/6.4, 55.1, 6.11, 6.12, 39.1, 6.2; 418/55.1, 418/94; 60/39.08; 384/144; 210/167.04
See application file for complete search history.

(56) References Cited

U.S. PATENT DOCUMENTS 2,650,671 A 9/1953 Brickett
3,531,935 A 10/1970 Poucher
3,614,257 A 10/1971 Campbell
4,339,160 A 7/1982 McHugh
4,344,506 A 8/1982 Smith (Continued)

FOREIGN PATENT DOCUMENTS

EP 1544417 A2 6/2005

(Continued)

OTHER PUBLICATIONS

Weinstock, Vladimir D., et al., Modeling Oil Flows in Engine Sumps: Drop Dynamics and Wall Impact Simulation, pp. 1-19, 2002 American Institute of Aeronautics and Astronautics, Inc.

(Continued)

*Primary Examiner*—Robert A Siconolfi
*Assistant Examiner*—San Aung
(74) *Attorney, Agent, or Firm*—Ray Meiers; Meiers Law Office LLC

(57) ABSTRACT

A sump housing for scavenging lubricant is disclosed herein. The sump housing includes an outer wall defining a chamber. A lubricated structure operable to rotate can be disposed within the sump housing. The sump housing also includes an out-take for lubricant scavenging. The out-take extends across a chordal arc of the chamber. The out-take includes an upstream first portion of the outer wall diverging away from the chordal arc at a first rate. The out-take also includes a downstream second portion of the outer wall opposite the first portion. The second portion diverges away from the chordal arc toward the first portion at a second rate greater than said first rate to define a blunt wall facing the first portion for reducing the likelihood that windage will limit lubricant scavenging.

13 Claims, 8 Drawing Sheets

U.S. PATENT DOCUMENTS

| | | | |
|---|---|---|---|
| 4,422,821 A | 12/1983 | Smith | |
| 4,525,995 A | 7/1985 | Clark | |
| 4,531,358 A | 7/1985 | Smith | |
| 4,576,001 A | 3/1986 | Smith | |
| 4,599,979 A | 7/1986 | Breckenfeld et al. | |
| 4,683,389 A | 7/1987 | Readman et al. | |
| 4,683,714 A | 8/1987 | Thebert | |
| 4,683,984 A | 8/1987 | Cohen et al. | |
| 4,756,664 A | 7/1988 | Cohen et al. | |
| 4,824,264 A | 4/1989 | Hoebel | |
| 4,858,427 A | 8/1989 | Provenzano | |
| 5,106,209 A | 4/1992 | Atkinson et al. | |
| 5,121,815 A | 6/1992 | Francois et al. | |
| 5,183,342 A | 2/1993 | Daiber et al. | |
| 5,261,751 A | 11/1993 | Heinz | |
| 5,489,190 A | 2/1996 | Sullivan | |
| 5,494,355 A * | 2/1996 | Haase | 384/144 |
| 5,584,650 A | 12/1996 | Redmond et al. | |
| 5,813,214 A | 9/1998 | Moniz et al. | |
| 6,330,790 B1 | 12/2001 | Arora et al. | |
| 6,438,938 B1 | 8/2002 | Burkholder et al. | |
| 6,516,618 B1 | 2/2003 | Bock | |
| 6,623,238 B2 | 9/2003 | Langston et al. | |
| 6,634,459 B1 * | 10/2003 | Litkenhus et al. | 184/6.12 |
| 6,672,102 B1 | 1/2004 | Huenniger et al. | |
| 6,682,222 B2 | 1/2004 | Fisher | |
| 6,996,968 B2 | 2/2006 | Peters et al. | |
| 7,021,912 B2 | 4/2006 | Tsuchiya et al. | |
| 2004/0156729 A1 | 8/2004 | Waterworth et al. | |
| 2005/0132710 A1 | 6/2005 | Peters et al. | |
| 2005/0160737 A1 * | 7/2005 | Perlo et al. | 60/772 |
| 2005/0166570 A1 | 8/2005 | Granitz et al. | |
| 2006/0002645 A1 | 1/2006 | Swainson | |
| 2006/0037302 A1 | 2/2006 | Peters et al. | |
| 2006/0037325 A1 | 2/2006 | Peters et al. | |
| 2006/0054408 A1 | 3/2006 | Swainson | |
| 2006/0081419 A1 | 4/2006 | Care et al. | |

FOREIGN PATENT DOCUMENTS

| | | |
|---|---|---|
| GB | 638 | 1/1915 |
| GB | 638 | 9/1915 |
| GB | 976054 | 11/1964 |
| GB | 1050391 | 12/1966 |
| JP | 2005180427 A | 7/2005 |

OTHER PUBLICATIONS

Canino, James V., Characterization of the Turbulent Windage in an Annulus and Its Incorporation Into Two Sump Design Codes, pp. i-x and pp. 1-75, Dec. 2002.

Glahn, A. et al., Feasibility Study on Oil Droplet Flow Investigations Inside Aero Engine Bearing Chambers-PDPA Techniques in Combination With Numerical Approaches, Journal of Eng. For Gas Turbines and Power, Oct. 1996, vol. 118, pp. 749-755.

Wittig, S., et al., Influence of High Rotational Speeds on Heat Transfer and Oil Film Thickness in Aero-Engine Bearing Chambers, Journal of Engineering for Gas Turbines and Power, Apr. 1994, vol. 116, pp. 395-401.

Shimo, Masayoshi, et al., Modeling Oil Flows on Seal Runners and Engine Sump Walls, Journal of Engineering for Gas Turbines and Power, Oct. 2005, vol. 127, pp. 827-834.

Glahn, A., Two-Phase Air/Oil Flow in Aero Engine Bearing Chambers: Characterization of Oil Film Flows, Journal of Engineering for Gas Turbines and Power, Jul. 1996, vol. 118, pp. 578-583.

* cited by examiner

SUMP HOUSING

CROSS-REFERENCE TO RELATED APPLICATIONS

This application claims the benefit of U.S. Provisional Patent Application Ser. No. 60/865,679 for a LUBRICATION SCAVENGE SYSTEM, filed on Nov. 14, 2006, and also claims the benefit of U.S. Provisional Patent Application Ser. No. 60/865,680 for a LUBRICATION SCAVENGE SYSTEM, filed on Nov. 14, 2006; both are hereby incorporated by reference in their entireties.

BACKGROUND OF THE INVENTION

1. Field of the Invention

The invention relates to a sump housing for scavenging lubricant from a lubricated component rotating at relatively high speed such as, for example, a shaft or bearing of a turbine engine.

2. Description of Related Prior Art

Structures rotating at relatively high speeds are found in many operating environments including, for example, turbine engines for aircraft and for power generation, turbochargers, superchargers, and reciprocating engines. The rotating structures in these operating environments are often supported by lubricated components such as bearings. Other components in these environments can also receive lubricant, including seal runners and gears. A stationary structure, such as a sump, is often disposed to surround the lubricated component and to collect the lubricant expelled from the lubricated component.

The performance and life of the lubricant can be enhanced if the expelled lubricant is removed from the sump relatively quickly. When the expelled lubricant resides in the sump for a relatively extended period of time, the lubricant may be undesirably churned and rapidly overheated which degrades the desirable tribological properties of the lubricant. The life of the lubricated components can in turn be enhanced if the performance and life of the lubricant is enhanced.

In many conventional lubrication systems, lubricant is supplied to the lubricated components under pressure and the system then relies on gravity to drain the lubricant from the sump. The flow of lubricant away from lubricated components can be complicated in airborne applications since the attitude of the lubricated components can change and negate the effects of gravity on the flow of lubricant.

SUMMARY OF THE INVENTION

In summary, the invention provides an apparatus and method for scavenging lubricant. In the invention, a sump housing for scavenging lubricant includes an outer wall defining a chamber. A lubricated structure operable to rotate can be disposed within the sump housing. The sump housing also includes an out-take for lubricant scavenging. The out-take extends across a chordal arc of the chamber. The out-take includes an upstream first portion of the outer wall diverging away from the chordal arc at a first rate. The out-take also includes a downstream second portion of the outer wall opposite the first portion. The second portion diverges away from the chordal arc toward the first portion at a second rate greater than said first rate to define a blunt wall facing the first portion for reducing the likelihood that windage will limit lubricant scavenging.

BRIEF DESCRIPTION OF THE DRAWINGS

Advantages of the present invention will be readily appreciated as the same becomes better understood by reference to the following detailed description when considered in connection with the accompanying drawings wherein.

DETAILED DESCRIPTION OF EXEMPLARY EMBODIMENTS

Figure 1:
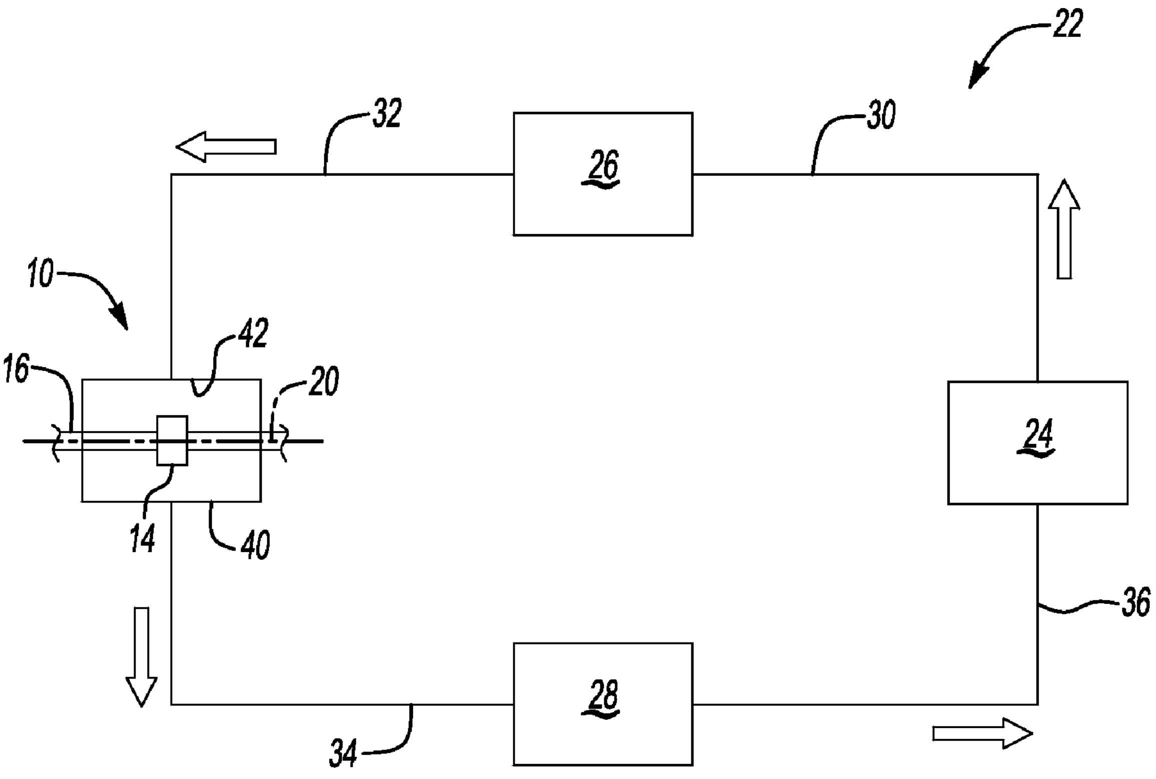
FIG. 1 is a schematic diagram of the operating environment of one embodiment of the invention.

A plurality of different embodiments of the invention are shown in the Figures of the application. Similar features are shown in the various embodiments of the invention. Similar features have been numbered with a common reference numeral and have been differentiated by an alphabetic designation. Also, to enhance consistency, features in any particular drawing may share the same alphabetic designation even if the feature is shown in less than all embodiments. Similar features are structured similarly, operate similarly, and/or have the same function unless otherwise indicated by the drawings or this specification. Furthermore, particular features of one embodiment can replace corresponding features in another embodiment unless otherwise indicated by the drawings or this specification.

Generally, a scavenge arrangement will include a sump housing for collecting lubricant expelled from a lubricated component and a scavenge pump communicating with the sump housing to draw expelled lubricant out of the sump housing. The capacity of the scavenge pump is often greater than the volumetric flow of lubricant to be moved out of the housing. The capacity of the scavenge pump can be partially consumed by lubricant and partially consumed by air. Preferably, the percentage of capacity consumed by lubricant is maximized. However, it has been found that moving air may consume excessive capacity of the scavenge pump such that the volumetric flow of lubricant out of the sump housing is compromised and lubricant may pool in the sump housing. The present invention provides an arrangement of structures for separating moving air from lubricant in a sump housing. The air is separated from the lubricant so that the capacity of a scavenge pump consumed by lubricant will be enhanced and preferably maximized.

Figure 2:
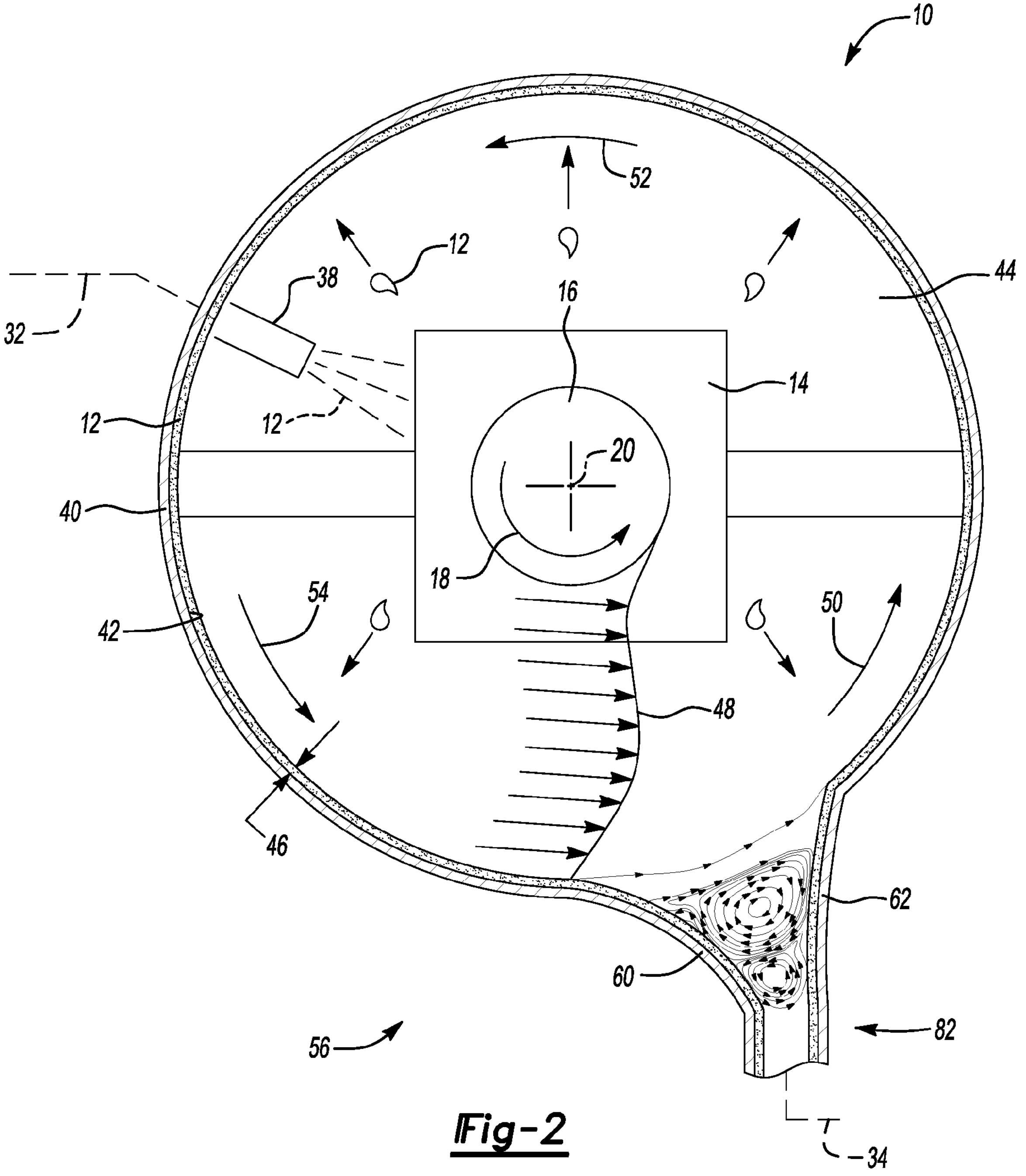
FIG. 2 is a cross-sectional view of the first disclosed embodiment of the invention in a plane perpendicular to an axis of rotation.

Referring now to FIG. 1, in a first exemplary embodiment of the invention, a sump housing 10 is part of a re-circulating lubrication system 22. As shown in FIG. 2, the sump housing is disposed to scavenge lubricant 12 ejected from a bearing 14 and a shaft 16. The shaft 16 and an inner race of the bearing 14 are structures disposed for rotation about an axis 20, in a direction represented by arrow 18. In alternative embodiments of the invention, the sump housing 10 can scavenge lubricant ejected from some other kind of structure, such as a gear or a seal or any other rotating structure.

Referring again to FIG. 1, the system 22 can be part of a turbine engine or any other operating environment in which a lubricated structure rotates at relatively high speed. The system 22 also includes a reservoir 24, a primary pump 26, a scavenge pump 28, and fluid lines 30, 32, 34, 36 connecting the sump housing 10, the reservoir 24, the primary pump 26, and the scavenge pump 28. Lubricant 12, such as oil, is drawn through the fluid line 30 from the reservoir 24 by the primary pump 26. Lubricant 12 is directed through the fluid line 32 by the primary pump 26 to the sump housing 10. The lubricant 12 is sprayed on the bearing 14 and/or the shaft 16 supported by the bearing 14 by a nozzle 38 (shown in FIG. 2) disposed in the sump housing 10. Lubricant 12 is drained from the sump housing 10 through the fluid line 34 by the scavenge pump 28. Lubricant 12 is directed through the fluid line 36 by the scavenge pump 28 to return the lubricant 12 to the reservoir 24.

Referring again to FIG. 2, the sump housing 10 extends along the axis 20 and includes an outer wall 40 with an inner surface 42 defining a chamber 44. The view of FIG. 2 is a plane normal to the axis 20. The axis 20 is also the longitudinal axis of the sump housing 10 in the first exemplary embodiment. Embodiments of the sump housing 10 can have any desired inner radius.

The lubricated bearing 14 is disposed within the chamber 44. In operation, the lubricant 12 is expelled from the bearing 14 and collects on the inner surface 42 to a lubricant film height 46. In FIG. 2, the lubricant 12 appears to have a constant film height 46, however, film height 46 may vary at different positions about the axis 20.

Forces act on the lubricant 12 disposed on the inner surface 42 which tend to induce movement of the lubricant 12. These forces include gravity, momentum acquired from the rotating structures prior to being expelled radially outward to the inner surface 42, g-forces, and shear forces associated with windage 48. Windage 48 is moving air disposed within the sump housing 10 that is itself urged in motion by rotation of the shaft 16. The flow field of the windage 48 is represented by a velocity profile that can be determined by solving standard turbulent flow equations in either closed form or by using commercial CFD software. The velocity of the windage 48 at the lubricant film height 46 will be some fraction of the tangential component of the angular velocity of the shaft 16. A generalization of a velocity profile defined between the velocity of the air at the shaft 16 and the velocity of the air at the lubricant film height 46 can be referred to as the bulk air flow velocity. The bulk air flow velocity is a percentage of the tangential component of the angular velocity of the shaft 16. The windage 48 at the lubricant film height 46 will act on the surface of the lubricant 12, urging movement of the lubricant 12 in the rotational direction, as shown by arrows 50, 52, 54.

The sump housing 10 includes an out-take 56 for lubricant scavenging. The out-take 56 extends across a chordal arc 58 (shown in FIG. 4) of the chamber 14. The chordal arc 58 is concentric with and has the same radius as the cylindrical portion of the sump housing 10. In other words, the chordal arc 58 completes the circle that would be defined by the inner surface 42 if the out-take were not present. The out-take 56 includes a first portion 60 of the outer wall 40 diverging away from the chordal arc 58 at a first rate. The first portion 60 is disposed on the forward or upstream side of the out-take 56. In the first exemplary embodiment of the invention, the inner surface 42 extends along a path that is concentric to the chordal arc 58 in the lubricant flow direction (the direction of rotation of the shaft 16) until reaching the first portion 60.

Figure 4:
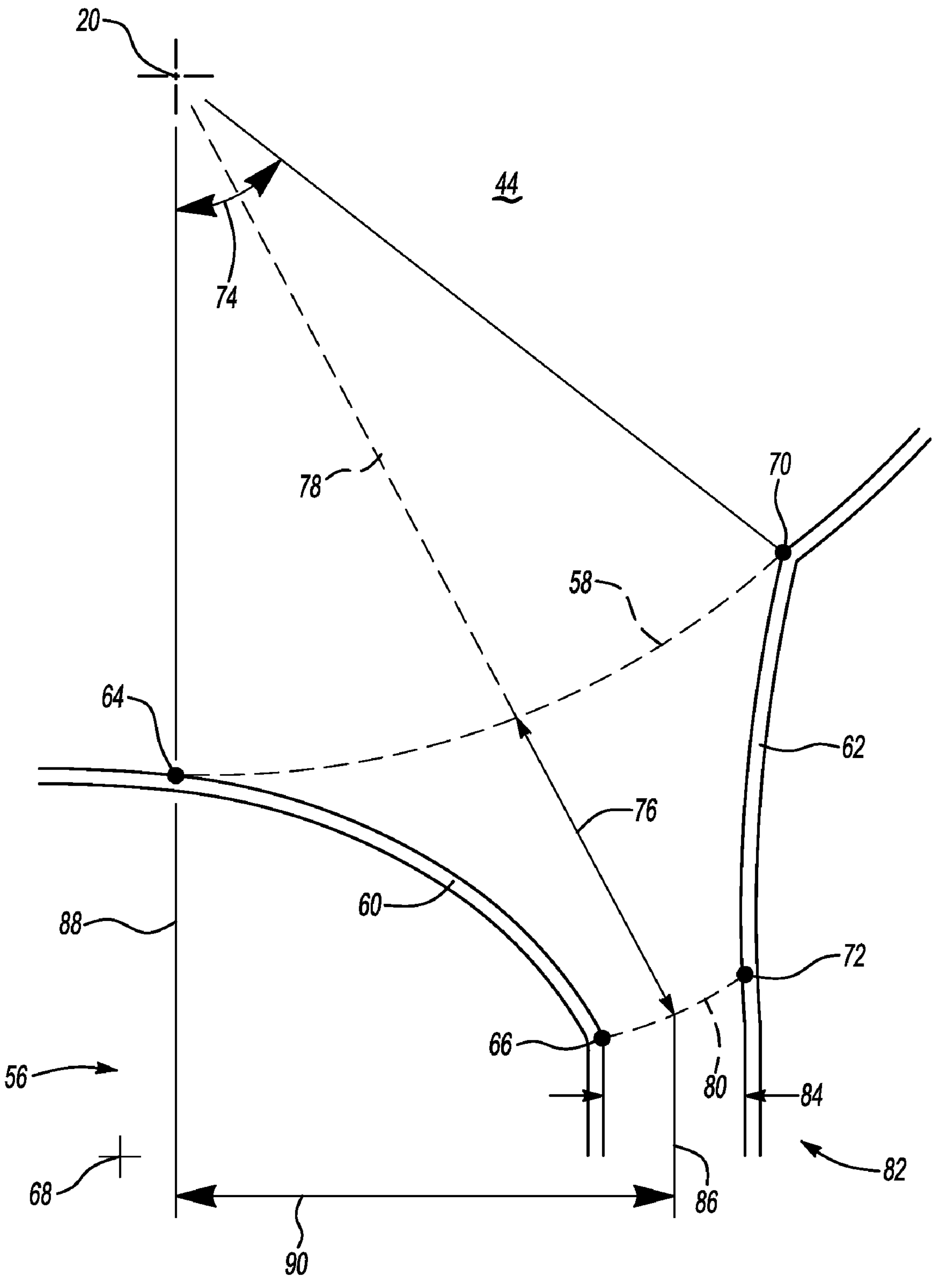
FIG. 4 is an enlarged portion of FIG. 2 similar to FIG. 3 with some structure removed to enhance the clarity of the remaining structure.

The first rate can be defined as the rate of change in the distance between the inner surface 42 and the axis 20 over a particular angle about the axis 20. As best shown in FIG. 4, the exemplary first portion 60 extends from a first end or first upstream point 64 at bottom dead center of the sump housing 10 to a second end or first downstream point 66 spaced from the first upstream point 64 about the axis 20 in the direction of rotation of the shaft 16. The terms "upstream" and "downstream" refer to flow of moving air in the chamber 44. In the first exemplary embodiment of the invention, the first upstream point 64 is disposed at bottom dead center. The exemplary first downstream point 66 is spaced from bottom dead center in the direction of rotation of the shaft 16. The first upstream point 64 may be spaced from bottom dead center and the second end may be spaced any desired distance from the first upstream point 64 in alternative embodiments of the invention. It is also noted that the sump housing 10 can be used in operating environments where the orientation of the sump housing 10 relative to the direction of gravity is not constant, such as aircraft applications.

The exemplary first rate of divergence results in the shape of the first portion 60 being circular in a plane perpendicular to the axis 20. In alternative embodiments of the invention, the first rate could be different than the first exemplary embodiment and thereby result in the first portion 60 being a different shape, such as a straight ramp-like shape, a spiral shape, an elliptical shape, any combination of these shapes. In the exemplary embodiment, the first portion 60 is circular and convex relative to the chamber 44 such that a center of the circular profile, represented by a point 68, is disposed on a side the first portion 60 opposite the axis 20.

The out-take 56 also includes a second portion 62 of the outer wall 40 opposite the first portion 60. The downstream second portion 62 is disposed on the aft or downstream side of the out-take 56. The second portion 62 diverges away from the chordal arc 58 toward the first portion 60 and a second rate greater than the first rate to define a blunt wall 62 facing the gentle slope of the first portion 60. In other words, the absolute value of the second rate is greater than the absolute value of the first rate. In the first exemplary embodiment of the invention, the inner surface 42 extends along a path that is concentric to the chordal arc 58 in a direction opposite to the direction of rotation until reaching the second portion 62. The second rate is defined as the first rate is defined, the change in radial distance between the inner surface 42 and the axis 20 over the change in angular position about the axis 20. The exemplary second portion 62 extends from a first end or second downstream point 70 to second end or second upstream point 72 spaced from the first end 70 about the axis 20 in the direction opposite to the direction of rotation. The first and second ends 70 may be spaced as desired relative to bottom dead center and/or relative the first and second ends 64, 66 of the first portion 60 in alternative embodiments.

The exemplary second rate results in the shape of the second portion 62 being circular in a plane perpendicular to the axis 20. In alternative embodiments of the invention, the second rate could be different than the first exemplary embodiment and thereby result in the second portion 62 being a different shape, such as a straight ramp-like shape, a spiral shape, an elliptical shape, any combination of these shapes. In the exemplary embodiment, the second portion 62 is convex relative to the chamber 44. The radius of the second portion 62 is greater than the radius of the first portion 60 in the first exemplary embodiment of the invention. A minimal round can be defined at the first end 70, between the second portion 62 and the remainder of the outer wall 40, to enhance the flow of lubricant 12 around the first end 70.

Figure 5:
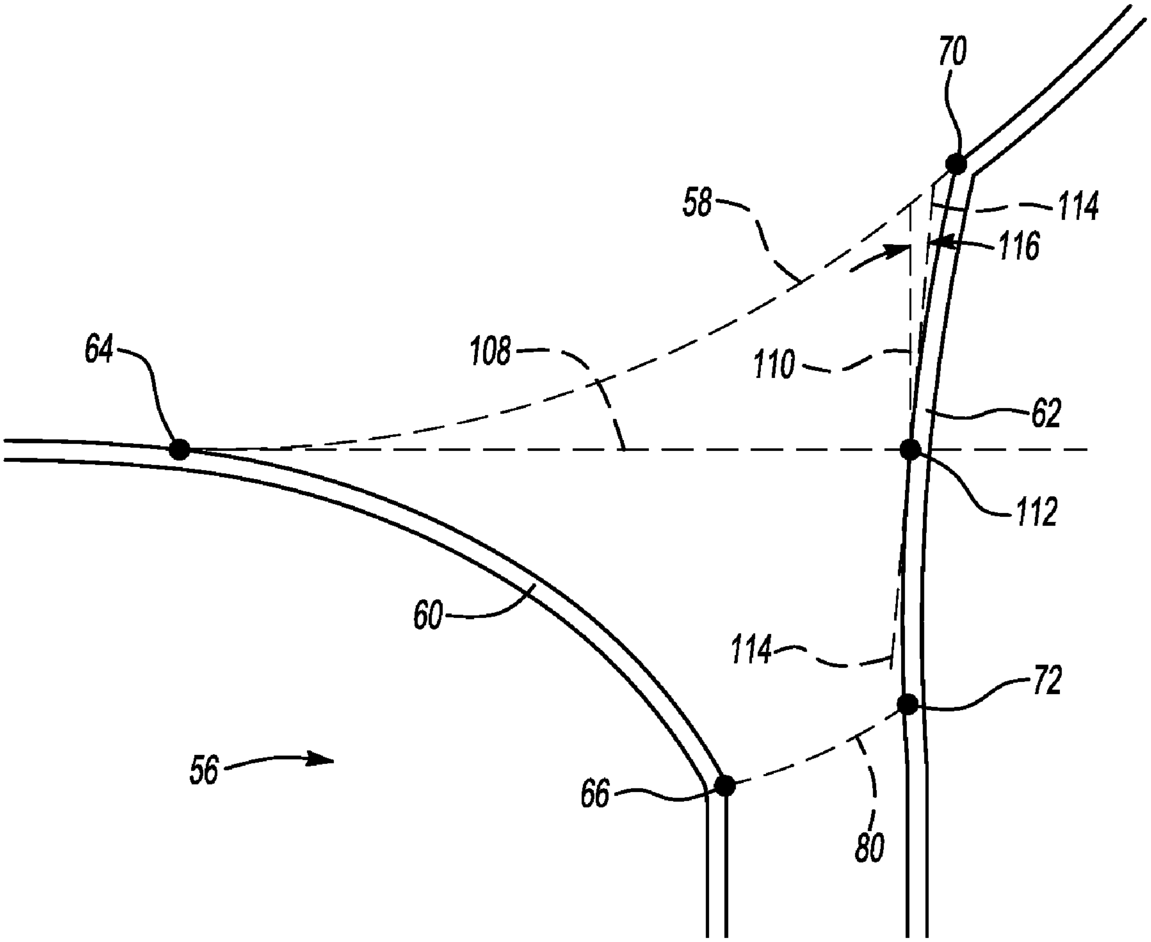
FIG. 5 is an enlarged portion of FIG. 2 similar to FIG. 3 with some structure removed to enhance the clarity of the remaining structure.

FIG. 5 shows the relative "bluntness" of the wall or second portion 62 in the exemplary embodiment of the invention. An imaginary line 108 is shown extending from and/or through the point 64. The point 64 is one end of the chordal 58 arc and is also the point along the inner surface 42 (see FIG. 2) where the first upstream portion 60 begins to diverge away from the circular profile of the sump housing. The line 108 is tangent to the chordal arc 58 and to the inner surface 42 at point 64. The downstream blunt wall 62 is arranged to be substantially perpendicular to the line 108. A line 110 is precisely perpendicular the line 108 and extends through a point 112; the point 112 is the point at which the line 108 intersects the outer surface of the second portion 62. A line 114 extends between the first and second ends 70, 72 of the second portion and represents the through point 112 and is tangent to the blunt wall 62 at the point 112. The blunt wall 62 is offset an angle 116 from being precisely perpendicular to the line 108 at the point 112. In embodiments of the invention in which the blunt wall 62 is offset from perpendicular at the point 112, the angle 116 can be greater than zero up to about twenty degrees. The smaller the angle of offset, the more likely an air vortex operable to separate air from lubricant will be created.

The chordal arc 58 of the out-take 56 extends between the respective first ends 64, 70 of the first and second portions 60, 62. An angle 74 is defined between the ends of the chordal arc 58. In the exemplary embodiment of the invention, the upstream edge of the angle 74 (defined at the first upstream point 64) is disposed at bottom dead center. As a result, the entire range of the angle 74 is downstream of bottom center. In alternative embodiments of the invention, the upstream edge of the angle 74 could be disposed upstream of bottom dead center.

The out-take 56 defines a depth represented by arrow 76. The arrow 76 extends along an axis 78 that intersects the axis 20 of rotation. The arrow 76 extends between the choral arc 58 and a secondary arc 80. The secondary arc 80 is concentric with the chordal arc 58; both arcs 58 and 80 are centered on the axis 20. The secondary arc 80 extends between the respective second ends 66, 72 of the first and second portions 60, 62. Thus, the depth of the out-take 56 is the distance from the chordal arc 58 to the point where the out-take 56 merges with a drain of substantially constant width (described in greater detail below).

The out-take 56 merges with a drain portion 82. The exemplary drain portion 82 is of substantially constant diameter, represented by arrow 84, and has straight walls in the plane normal to the axis 20. The first portion 60 transitions to the drain portion 82 at the first downstream point 66 and the second portion 62 transitions to the drain portion 82 at the second end 72. The drain portion 82 extends along a drain axis 86. The drain axis 86 is offset from an axis 88 that extends through bottom dead center of the sump housing 10 and the axis 20 of rotation. Arrow 90 represents the distance between the axes 86, 88.

The relative configurations of the first and second portions 60, 62 cooperate during operation such that at least one air vortex 92 is created in the out-take 56. This vortex 92 urges lubricant out of the sump housing 10 while concurrently reducing the likelihood that air will exit the sump housing with the lubricant, or will meaningfully compete with the lubricant for scavenge capacity. Competition between lubricant and air over scavenge capacity can occur in sump housings generally.

It has been found that the bulk of the lubricant film velocity, also discussed above, is a smaller fraction of the tangential component of the angular velocity of the shaft 16 than the bulk air flow velocity of the windage 48. This is generally of no consequence anywhere within the sump housing 10 except where it is necessary to drain the lubricant 12 out of the sump housing 10. Generally, at the drain of a sump, air associated with windage can compete with the lubricant for space in the drain and for space (or capacity) of a scavenge pump. For example, a scavenge pump used to drain a sump housing usually has a fixed capacity. If air can enter the drain of the sump, this faster moving air can compete with relatively slower moving lubricant for the fixed pump volume and result in reverse flow of lubricant out of the drain. This reverse flow can thus cause a pool of lubricant to form at the drain. Forces can then act on this lubricant pool and cause churning and radial transport of lubricant along the end walls of the sump housing and into the shaft seals. When this occurs, this lubricant pool has also lost its circumferential velocity and can no longer drain without being forced somehow into circumferential motion again so that it can be transported back to the drain so that it can exit the sump housing. The extra residence time and churning cause degradation due to heating and aeration of the lubricant. Therefore, it is generally desirable to reduce the likelihood that air will exit the sump housing with the lubricant or will compete with the lubricant for scavenge capacity at the drain.

Figure 3:
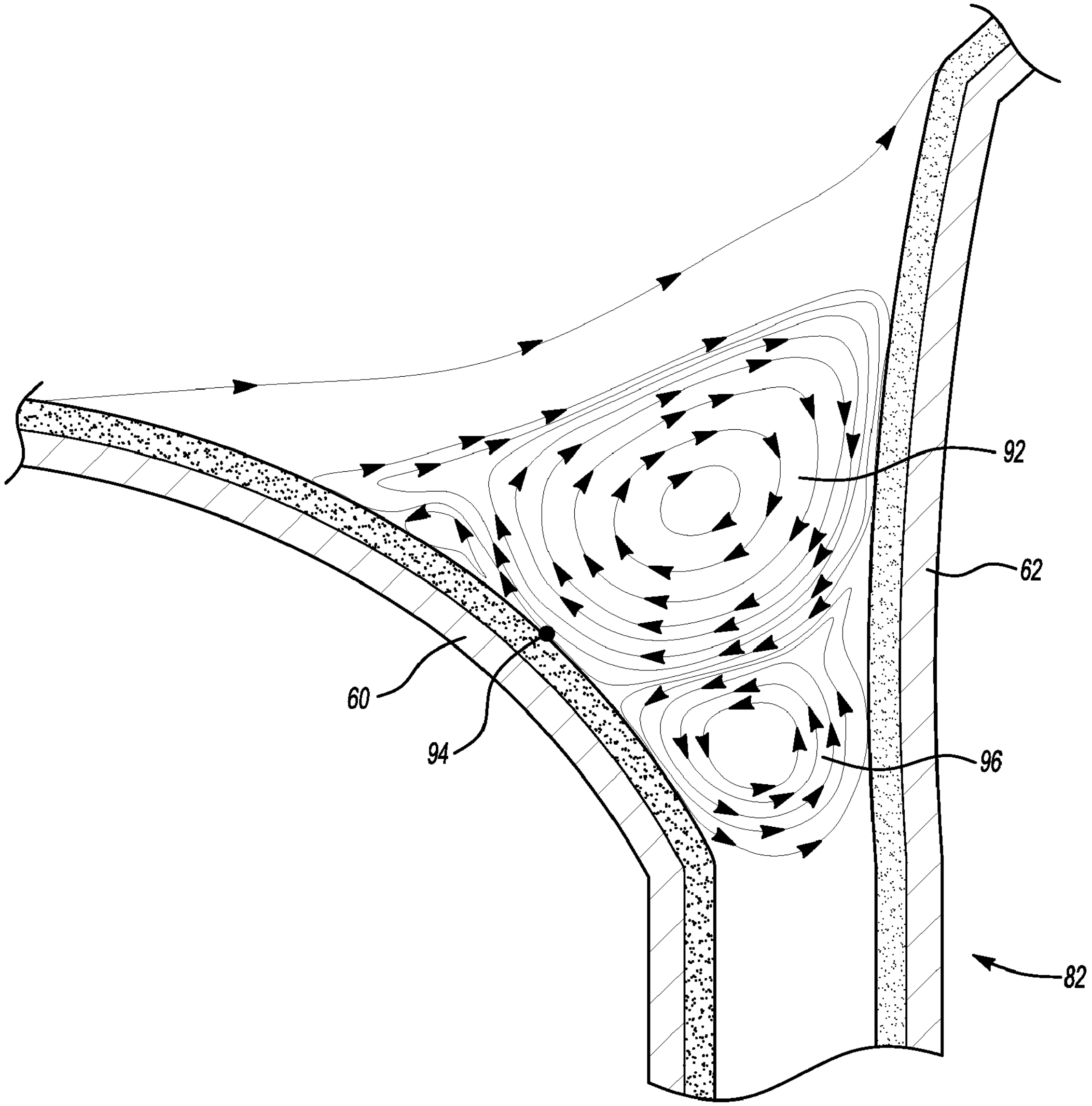
FIG. 3 is an enlarged portion of FIG. 2 to enhance the clarity of a vortex formed during operation of the first exemplary embodiment of the invention.

The vortex 92 urges lubricant out of the sump housing 10 while concurrently reducing the likelihood that air will exit the sump housing 10 with the lubricant, or will meaningfully compete with the lubricant for scavenge capacity. As best shown in FIG. 3, the left side of the vortex 92 is adjacent to the first portion 60 of the out-take 56. The left side of the vortex 92 is shown acting generally against the flow of lubricant 12 to the drain portion 82. However, it has been found that the velocity of the air in the vortex 92 along the first portion 60 is negligible. At a point 94 the velocity of moving air in the vortex is approximately maximum and is yet a relatively small percentage of the tangential velocity of windage 48 acting on the lubricant 12 at bottom dead center 64. Despite the air velocity along the left-hand side of the vortex may be maximized at point 94, gravity and momentum are relatively more dominant in predicting lubricant flow at point 94 and are therefore more useful in controlling lubricant flow. On the right side, the vortex 92 is disposed adjacent to the second portion 62. FIG. 2 shows that the right side of the vortex 92 cooperates with momentum in urging lubricant toward the drain portion 82.

At the bottom of the vortex 92, air is urged to circle around clockwise and return toward the chamber 44. This phenomena is the result of the relative configurations of the first and second portions 60, 62. Consequently, the air is generally not driven into the drain portion 82, but is rather directed away from the drain portion 82 at the bottom of out-take 56. The geometry of the out-take 56 can be varied to enhance the characteristics of the vortex 92, including the depth of the out-take 56 as represented by arrow 76, the angular size of the out-take 56 about the axis 20 as represented by angle 74, the first and second rates of divergence, and the positions of the first and second portions 60, 62 relative to bottom dead center of the sump housing 10.

FIGS. 2 and 3 show that a smaller vortex 96 can also be generated during operation. The left side of the vortex 96 is adjacent to the first portion 60 of the out-take 56 and cooperates with gravity in urging lubricant toward the drain portion 82. On the right side, the vortex 96 is disposed adjacent to the second portion 62 and acts generally against the flow of lubricant 12 to the drain portion 82. However, it has been found that the velocity of the vortex 96 along the second portion 62 is negligible. Thus, gravity and momentum are relatively more dominant in predicting lubricant flow along the second portion 62 adjacent the vortex 96 and are therefore useful in controlling lubricant flow. The vortex 96 circles in a counter-clockwise direction and does not meaningfully compete with lubricant for scavenging capacity.

In the first disclosed embodiment of the invention, the sump housing 10 and the inner surface 42, other than the first and second portions 60 and 62, are cylindrical and symmetrical about the axis 20. In alternative embodiments of the invention, the sump housing 10 can be asymmetrical about the longitudinal axis 18 and need not be cylindrical in a general, overall sense. The fact that the sump housing 10 may or may not be cylindrical at a given axial section does not abrogate the workings of the broader invention. Also, the sump housing 10 can house more than one bearing 14 or more than one lubricated component.

The following is an example of one arrangement for practicing the first embodiment of the invention to generate an air vortex.

EXAMPLE

An exemplary sump housing was constructed with an inner radius of about 4.625 inches. The first end of the first portion of the out-take was at bottom dead center and the second end of the first portion was spaced about 11.5° away from bottom dead center. The first rate of divergence of the first portion resulted in the shape of the first portion being circular with a radius of 0.923 inch in the plane perpendicular to the axis of rotation. The first end of the second portion was spaced about 41° from bottom dead center and the second end of the second portion was spaced about 19° from bottom dead center. The second rate of divergence resulted in the second portion being circular with a radius of 5.769 inches in the plane perpendicular to the axis of rotation. The exemplary angle of the chordal arc was about 41.5°. The drain depth was about 1 inch and the drain was offset about 1.5 inches. A structure was disposed in the sump housing and rotated at about 5,000 rpm to 15,000 rpm. The blunt wall was about 5-10 degrees offset from perpendicular.

The dimensions provided by the example set forth above are for illustration only and are not limiting to the invention. The dimensions provided herein can be helpful when considered relative to one another. For example, the example may be considered a relatively small embodiment. In a relatively large embodiment of the invention, one or more of the dimensions provided herein may be multiplied as desired. Also, different operating environments may dictate different relative dimensions.

Figure 6:
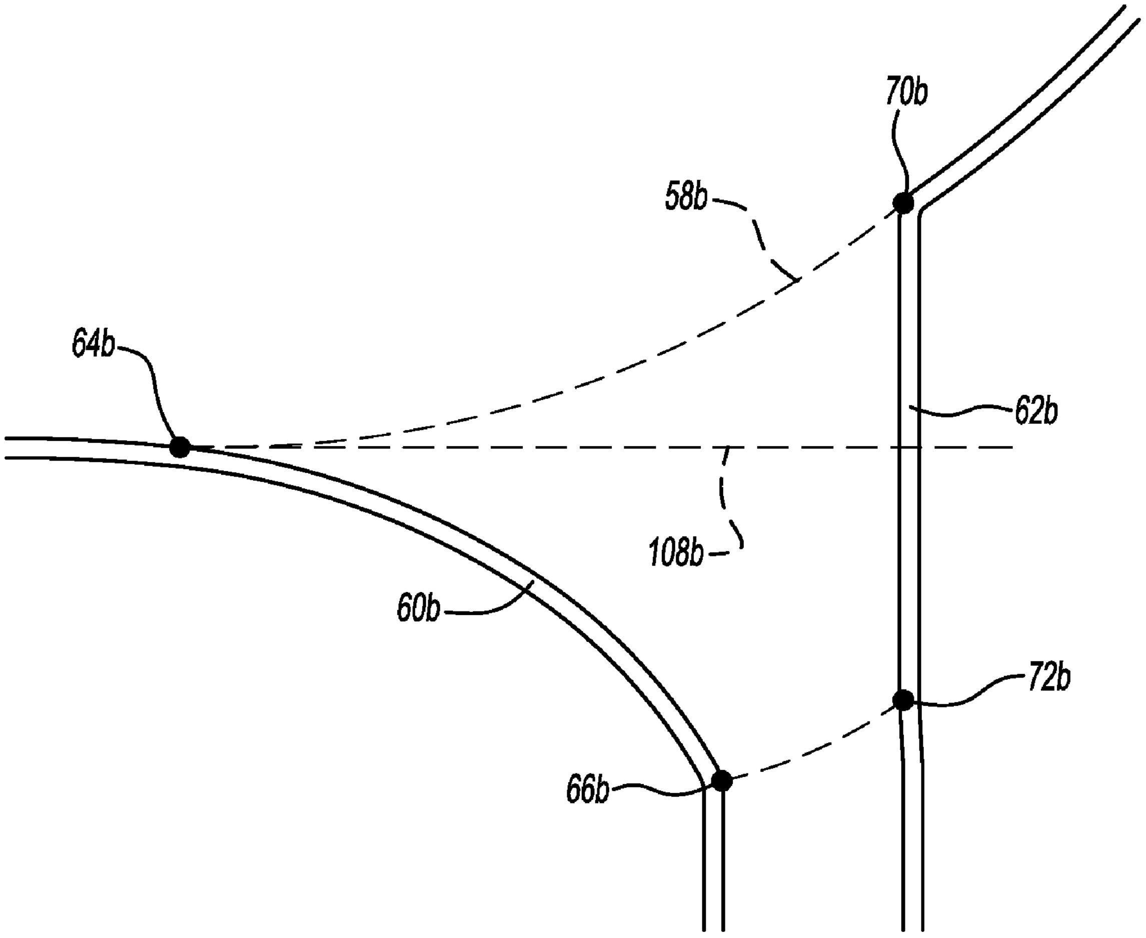
FIG. 6 is a view similar to FIG. 5 but of a second, alternative embodiment of the invention.

The straightness or curvature of the outer surface of the blunt wall 62, the angle or extent of offset from perpendicular of the blunt wall 62, the drain depth, and the drain offset can be varied in view of one another in alternative embodiments of the invention to separate the moving air from the lubricant moving along the inner surface 42. Several different geometric arrangements can be applied to practice the invention. Generally, it may be desirable to select a relatively smaller angle of offset from perpendicular in combination with a relatively straight blunt wall 62. For example, FIG. 6 shows an embodiment of the invention that includes a first portion **60*b* extending between a point 64*b* and a first downstream point 66*b*, a second portion or blunt wall 62*b* extending between ends 70*b* and 72*b*, and a chordal arc 58*b* extending from the point 64*b* to the end 70*b*. The blunt wall 62*b* is flat and precisely perpendicular to a line 108*b* that is tangent to the chordal arc 58*b* at the point 64*b*. Alternatively, it may be desirable to offset the blunt wall 62 from perpendicular in combination with forming the blunt wall 62** to be arcuate, as shown in the first exemplary embodiment of the invention. The drain depth and drain offset can also be varied in view of the desired shape of the blunt wall and vice-versa.

Referring again to FIG. 5, the blunt wall 62 is configured to separate moving air from lubricant while concurrently not acting like an air scoop. The portion of the blunt wall 62 between the end 70 and the point 112 is at least perpendicular to the line 108 or falls away relative to perpendicular. In other words, with reference to the perspective of FIG. 5, the portion of the blunt wall 62 extending from the point 112 to the end 70 extends away from the first portion 60. The portion of the blunt wall 62 between the end 70 and the point 112 does not extend in the direction of the first portion 60 and therefore will not act as an air scoop.

Figure 7:
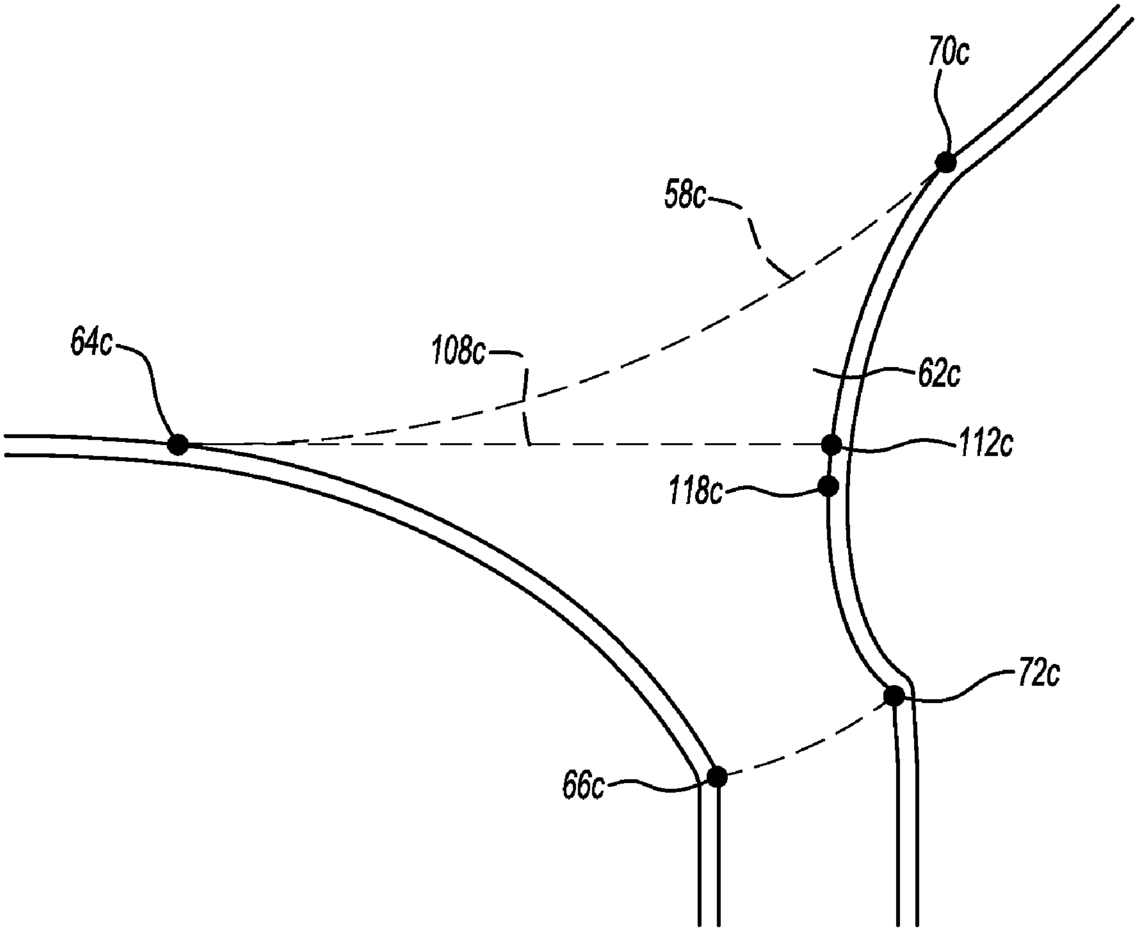
FIG. 7 is a view similar to FIG. 5 but of a third, alternative embodiment of the invention.

The portion of the blunt wall 62 extending from the point 112 to the second end 72 preferably extends perpendicular to the line 108 or extends toward the first portion 60, at least initially. For example, in the first exemplary embodiment of the invention, the blunt wall 62 extends gradually toward the first portion 60 from the point 112 to the end 72. FIG. 7 shows a third alternative embodiment of the invention that includes a first portion **60*c* extending between a point 64*c* and a first downstream point 66*c*, a second portion or blunt wall 62*c* extending between ends 70*c* and 72*c*, and a chordal arc 58*c* extending from the point 64*c* to the end 70*c*. The blunt wall 62*c* is arcuate and is offset from perpendicular over a portion between the end 70*c* and a point 112*c*. The blunt wall 62*c* continues in the same general direction past the point 112*c*, toward the first portion 60*c*, to a transition point 118*c*. Between the transition point 118 and the second end 72*c*, the blunt wall 62*c* extends away from the first portion 60*c*. By extending the blunt wall 62*c* in the direction of the first portion 60*c* past the point 112*c***, the arrangement of the third exemplary embodiment enhances the separation of air from the lubricant.

Figure 8:
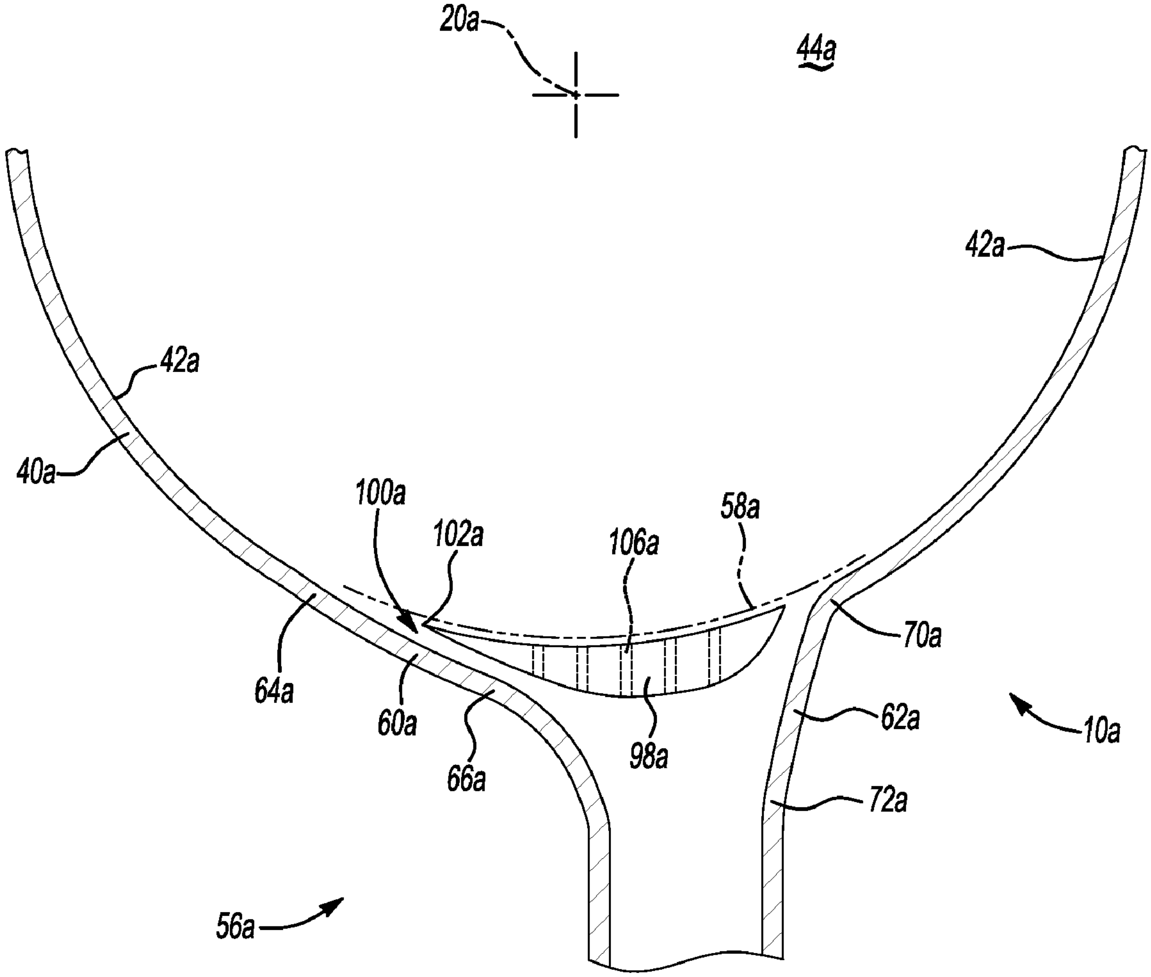
FIG. 8 is a view similar to FIGS. 3-5 but showing a fourth embodiment of the invention.

FIG. 8 shows a second embodiment of the invention. A sump housing **10*a* extends about an axis 20*a* and includes an outer wall 40*a* with an inner surface 42*a* around a chamber 44*a*. An out-take 56*a* is formed in the housing 10*a* and includes first and second portions 60*a*, 62*a* of the outer wall 40*a* and extending across a chordal arc 58*a*. The first portion 60*a* extends between first and second ends 64*a* and 66*a*. The second portion 62*a* extends between first and second ends 70*a* and 72*a*. The second embodiment is different than the first embodiment in several aspects. First, the first portion 60*a* is partially spiral and partially a circular round in the plane normal to the axis 20*a*. The first portion 60*a* diverges from the chordal arc initially along a spiral path and then transitions to a circular round before again transitioning to a drain portion 82*a*. The spiral segment of the first portion 60*a* can be defined by any spiral equation including Archimedean, Equiangular, Fermat, Lituus, Fibonacci, Theodorus, or any combination of these forms of spirals. In addition, the first portion 60*a* is concave relative to the chamber 44*a*. Also, the first upstream point 64*a* of the first portion 60*a*** is disposed upstream of bottom dead center.

The second embodiment also differs from the first embodiment by including a scavenge scoop **98*a***. In the first embodiment of the invention, a volume bounded by the first portion

60, the second portion 62, and the chordal arc 58 is fully exposed to the chamber 44. The relative structures result in the creation of the vortex 92 during operation. In the second embodiment of the invention, the scavenge scoop 98*a* reduces the likelihood that windage will limit lubricant scavenging by shearing or slicing the windage from the lubricant.

The scavenge scoop 98*a* is disposed above and cooperates with the first portion 60*a* to define an intake 100*a* for receiving lubricant moving along the inner surface 42*a*. The intake 100*a* has an intake height substantially equal to the height of lubricant to substantially prevent windage from entering the intake 100*a*. The intake height is the distance between the inner surface 42*a* along the first portion 60*a* and an upstream edge 102*a* of the scavenge scoop 98*a* and is selected to reduce the likelihood of air entering the intake 100*a*. The intake 100*a* efficiently separates the lubricant from the windage inside the sump housing 10*a*. The exemplary embodiment of the invention uses the surface tension and viscosity of the lubricant to separate the lubricant from the air. The scavenge scoop 98*a* diverts the air flow up and over the intake 100*a*. Basically, the lubricant remains attached to the inner surface 42*a* of the sump housing 10*a* and the windage does not remain attached to the surface of the lubricant. The lubricant will travel along the inner surface 42*a* and diverge from a circular path (in the plane perpendicular to the axis 20*a*) at the end 64*a* to the spiral path of the first portion 60*a*. After traveling along the spiral path, the lubricant enters the intake 100*a* below the edge 102*a*, downstream from the end 64*a*.

The dimension of the lubricant film height is responsive to several factors, including but not limited to the viscosity of the lubricant, the density of the lubricant, the surface tension of the lubricant, the rotational speed of the structure rotating in the sump housing 10*a*, the diameter of the rotating structure, the diameter of the inner surface 42*a* of the sump housing 10*a*, and the flow rate of lubricant into the sump housing 10*a*. The velocity of the lubricant film moving along the inner surface 42*a* is also responsive to these factors. It has been found that the lubricant film height and velocity can be calculated based on these factors in combination with mathematical models developed with computational fluid dynamics software. A first physical model can be prepared to evaluate the generation of lubricant droplets from the rotating structure. A second physical model can be prepared to evaluate the impact of lubricant droplets against the inner surface 42*a*. A third physical model can be prepared to evaluate fluid behavior around the intake 100*a*. These computational models can be developed and evaluated to determine the lubricant film height at the intake 100*a*. An alternative process for determining lubricant film height at the intake 100*a* would include constructing physical models of the sump housing 10*a* and testing the models in the field and/or under laboratory conditions. Testing physical models can verify the results of the computational models or can take the place of developing computational models.

Non-dimensional lubricant film heights of between 8.75897E-02 and 1.00000E+00 have been computed based on ranges of factors that tend to effect lubricant film height. For example, the ratio (R2/R1) of the radial distance from the axis 20*a* to the inner surface 42*a* (R2) to the radius of the rotating structure (R1) is believed to effect the lubricant film height. The ratio (R2/R1) in the computations ranged from 1.3-1.5. The invention can be practiced in environments wherein the ratio (R2/R1) is outside this range. In another example, the speed of rotation is believed to effect the lubricant film height. The speed of rotation in the computations ranged from 5000 rpm-25,000 rpm. The invention can be practiced in environments wherein the shaft rpm is outside this range. In another example, the temperature of the lubricant is believed to effect the lubricant film height. The temperature of the lubricant in the computations ranged from 50° F.-350° F. The invention can be practiced in environments wherein the temperature of the lubricant is outside this range. In another example, the flow rate of lubricant out of the sump housing is believed to effect the lubricant film height. The flow rate of lubricant out of the sump housing in the computations ranged from 0.1 gal/min-1.0 gal/min. The invention can be practiced in environments wherein the flow rate of lubricant out of the sump housing is outside this range.

The scavenge scoop 98*a* is positioned above the inner surface 42*a* a height substantially equal to the lubricant film height to reduce the likelihood of air entering the intake 100*a*. The scavenge scoop 98*a* may be positioned slightly higher than a theoretical or calculated lubricant film height. For example, waves may be generated on the surface of the lubricant film 12 in some operating environments, resulting in a slightly variable lubricant film height. In some of these operating environments, by way of example and not limitation, waves on the surface of the lubricant film could be approximately 10% of the film height. The position of the scavenge scoop 98*a* relative to the inner surface 42*a* can be determined based on the expected presence of surface waves on the surface of the lubricant film.

The exemplary scavenge scoop 98*a* extends away from the edge 102*a* along the chordal arc 58*a* with a windage deflecting or guiding surface 104*a*. The surface 104*a* extends away from the edge 102*a* about the axis 20*a* in the rotational direction and can limit turbulence associated with interaction between the windage and the edge 102*a*. Windage can be directed across the intake 100*a* along the deflecting surface 104*a* around the axis 20*a* without substantial disturbance in flow. The downstream side of the scavenge scoop 98*a*, opposite the edge 102*a*, can cooperate with the second portion 62*a* to define an opening for receiving lubricant flowing clockwise around the axis 20*a*. The scavenge scoop 98*a* can also include one or more perforations 106*a*, or through apertures, to increase the likelihood that lubricant will drain from the sump housing 10*a*. For example, the lubricant that may accumulate on the surface 104*a* can drain from the sump housing 10*a* through the perforations 106*a*.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A turbine engine comprising:

a structure disposed for rotation about an axis;

a lubrication system operable to direct lubricant to said structure;

a sump housing at least partially encircling said structure with an inner surface spaced from said structure to define a chamber for collecting lubricant expelled from said structure during rotation, wherein said inner surface includes an out-take for lubricant scavenging extending across a chordal arc in said chamber with an upstream first portion extending about said axis and veering away from said axis such that a radial distance between said axis and said first portion gently increases in a plane perpendicular to said axis for maintaining lubricant on said inner surface, and wherein said out-take also includes a downstream second portion facing said first portion and extending about said axis and veering away from said axis such that a radial distance between said axis and said second portion steeply increases to define a blunt wall in said plane opposing said first portion, and wherein said structure is operable to generate windage in said chamber and said out-take is exposed to said windage and promotes formation of an air vortex between said first and second portions.

2. The sump housing of claim 1 wherein said blunt wall is formed substantially perpendicular to an imaginary line tangent to said first upstream point of said upstream first portion.

3. The sump housing of claim 1 wherein said upstream portion extends from a first upstream point to a first downstream point and wherein said first upstream point is positioned at a bottom dead center position of said sump housing.

4. The sump housing of claim 1 wherein said chordal arc extends between a first end of said upstream first portion and a first end of said downstream second portion and wherein said first end of said downstream second portion is spaced further from a bottom dead center of said sump housing than said first end of said upstream first portion so that said out-take is angularly shifted from said bottom dead center.

5. The sump housing of claim 1 wherein said upstream first portion is further defined as arcuate in a cross-section.

6. The sump housing of claim 1 wherein said upstream first portion is further defined as being convex relative to said chamber.

7. The sump housing of claim 1 further comprising:

a drain portion different in cross-section from said out-take and operable to receive lubricant from said out-take, said drain portion extending along an axis that is rectilinearly offset from a center axis of said sump housing.

8. The sump housing of claim 1 further defined wherein a volume bounded by said upstream first portion and said downstream second portion and said chordal arc is fully exposed to said chamber.

9. The turbine engine of claim 1 wherein said first portion is further defined as circular in cross-section in said plane with a first radius and wherein said second portion is further defined as circular in cross-section in said plane with a second radius at least twice said first radius.

10. The turbine engine of claim 1 wherein said first portion is further defined as beginning at a bottom dead center position of said sump housing.

11. The turbine engine of claim 1 further comprising:

a drain portion disposed to receive lubricant from said first and second portions and extending along a drain axis offset from said axis.

12. A method for scavenging lubricant comprising the steps of:

rotating a structure about an axis of rotation and thereby urging air in motion about the structure to form windage;

directing lubricant to the structure with a lubrication system;

at least partially encircling the structure with a sump housing to collect lubricant expelled from the structure during said rotating step;

directing the expelled lubricant to an out-take extending along a chordal arc of the sump housing as the lubricant is exposed to the windage;

communicating the expelled lubricant from the out-take to a drain portion for scavenging; and arranging the out-take to separate the moving air from the expelled lubricant prior to said communicating step by directing lubricant away from the windage along an upstream first portion of the out-take that gently veers away from the axis in a plane perpendicular to the axis and by opposing the upstream first portion with a downstream second portion that steeply veers away from the axis in a plane perpendicular to the axis to define a blunt wall.

13. The method of claim 12 wherein said arranging step is further defined as including the step of:

arranging the out-take to form an air vortex in the out-take during said communicating step.

* * * * *